UNITED STATES PATENT OFFICE.

RUDOLF TAMBACH, OF LUDWIGSHAFEN-ON-THE-RHINE, GERMANY, ASSIGNOR TO THE FIRM OF KNOLL AND COMPANY, OF LUDWIGSHAFEN-ON-THE-RHINE, GERMANY.

DIGITALIS EXTRACT.

943,578.  Specification of Letters Patent.  Patented Dec. 14, 1909.

No Drawing. Application filed April 3, 1908. Serial No. 425,013.

*To all whom it may concern:*

Be it known that I, RUDOLF TAMBACH, a subject of the German Emperor, residing at Ludwigshafen-on-the-Rhine, Germany, have invented a Process of Making an Improved Digitalis Extract, of which the following is a specification.

It is known that various powerfully acting constituents may be isolated from digitalis leaves, which are very valuable in therapeutics. The products thus obtained have not, however, been able to supplant the continued use of the leaves themselves, partly on account of their high price, and partly because, when each is used separately, they do not exhibit the complete action of the fresh drug, or the freshly prepared extracts. The use of the leaves themselves possesses, however, the disadvantage, that the amount of active constituents which they contain is subject to very considerable fluctuations, according to the year's growth, place of origin, and time of gathering the plants, and that these active constituents undergo a constant, appreciable diminution with time, both in the drug, and in the extracts. This variable action of the leaves and the gradual decrease of their effectiveness are disadvantages, which are of very great importance in the therapeutics of digitalis, since too feebly acting doses often render the therapeutic effect doubtful, and too powerful doses produce unpleasant subsidiary effects. Furthermore, the digitalis leaves and their extracts are frequently badly sustained by the stomach. This arises partly from an irritant action of the therapeutically important constituents, and partly from superfluous materials in the drug which also pass over therewith into the extract.

In order that a digitalis extract may be well sustained by the stomach, these superfluous materials should be removed therefrom. Furthermore, the extract should possess an effective strength, which is known and always remains the same.

I have found, that a digitalis preparation which keeps well and has the full action of the fresh drug may be obtained, if the alcoholic extract of the digitalis leaves be exhaustively treated with ether. By this means those materials are removed which unnecessarily trouble the stomach and injuriously influence the keeping power of the extract. Only very small quantities (scarcely 5%) of the active materials, which are mechanically carried along, are lost with the ether precipitate.

*Example:* 10 kg. of finely powdered digitalis leaves are extracted a few times with fifty kilos of alcohol of high percentage, the extracts neutralized with alcoholic caustic soda solution, for example, and as such, or after concentration *in vacuo*, mixed with ether, as long as a precipitate forms. The extract separated from the precipitate is concentrated *in vacuo* and after the addition of two parts of milk sugar, or some other suitable vehicle, completely transformed into a pulverized form. In place of ethyl-alcohol, other alcohols, or other suitable solvents, may be employed, and instead of ether, petroleum-spirit, or some other suitable precipitant, may be used. The preparation so obtained is a gray-green powder, which may be adjusted according to medical requirements to the desired degree of effectiveness by means of further quantities of milk-sugar.

In the process described by Hager, *Handb. d. Pharmaz. Praxis*, 1903, 1, page 1042, paragraph 2, according to which digitalis leaves are extracted with a mixture of aqueous alcohol and ether, those substances which are injurious in their action and insoluble in the ether do not remain behind in the drug, notwithstanding the use of ether, as experiments have proved. On the contrary, almost twice as great quantities of these substances pass over as in my present process. Moreover, according to the known process these large quantities remain in the final product, *i. e.* the tincture, but are completely removed by my present process.

The improved digitalis preparations obtained as described, will not dissolve completely in cold or hot water, but will dissolve immediately on the addition of a two-per cent. soda solution with the aid of heat. From the solution thus obtained hydrochloric acid will separate out a substance which is insoluble in chloroform, easily soluble in alcohol and alkalis. If a few grains of this substance in a dried condition are dissolved in glacial acetic acid containing 1 per cent. of a 5 per cent. ferric-sulfate-solution and a layer of concentrated sulfuric acid is formed under this liquid, the intermediate layer or boundary will assume a strong reddish violet color, while the glacial acetic acid is colored yellowish-brown.

What I claim is:—

1. The herein described process for the manufacture of a permanent preparation from digitalis leaves, which consists in preparing an extract of the drug by means of highly concentrated alcohol and adding to the said extract ether as long as a precipitate is produced by this addition.

2. A permanent preparation from digitalis leaves, containing the therapeutically important constituents of the drug, without the inactive and injurious substances contained in the same, the said preparation not being completely soluble in cold and hot water, but dissolving immediately on the addition of a 2 per cent. sodium carbonate solution with the aid of heat, hydrochloric acid separating from the soluion thus obtained a substance which is insoluble in chloroform, easily soluble in alcohol and alkalies, substantially as described.

In testimony whereof I have hereunto set my hand in presence of two subscribing witnesses.

RUDOLF TAMBACH.

Witnesses:
 MAX DULGE,
 JOS. H. LEUTE.